(12) United States Patent
Schick et al.

(10) Patent No.: US 8,273,495 B2
(45) Date of Patent: Sep. 25, 2012

(54) ELECTROCHEMICAL CELL STRUCTURE AND METHOD OF MAKING THE SAME

(75) Inventors: Louis Andrew Schick, Delmar, NY (US); Cara Suzanne Libby, Alameda, CA (US); John Henry Bowen, Greenfield Center, NY (US); Richard Scott Bourgeois, Albany, NY (US)

(73) Assignee: General Electric Company, Niskayuna, NY (US)

( * ) Notice: Subject to any disclaimer, the term of this patent is extended or adjusted under 35 U.S.C. 154(b) by 946 days.

(21) Appl. No.: 11/739,264

(22) Filed: Apr. 24, 2007

(65) Prior Publication Data

US 2007/0193880 A1  Aug. 23, 2007

Related U.S. Application Data

(63) Continuation-in-part of application No. 11/103,971, filed on Apr. 12, 2005.

(51) Int. Cl.
- *H01M 8/02* (2006.01)
- *H01M 8/10* (2006.01)
- *C25B 9/00* (2006.01)
- *C25B 9/02* (2006.01)

(52) U.S. Cl. ............... 429/469; 429/463; 429/466
(58) Field of Classification Search ............ 204/252; 29/623.2; 429/179, 180
See application file for complete search history.

(56) References Cited

U.S. PATENT DOCUMENTS

| | | | |
|---|---|---|---|
| 3,778,362 A | 12/1973 | Weichers et al. | |
| 4,107,023 A | 8/1978 | Mentz | |
| 4,310,404 A * | 1/1982 | Satoh et al. | 204/252 |
| 5,843,292 A | 12/1998 | Spiros | |
| 6,086,643 A * | 7/2000 | Clark et al. | 29/623.2 |
| 6,527,921 B2 | 3/2003 | Kirk et al. | |
| 6,770,394 B2 | 8/2004 | Appleby et al. | |
| 2005/0069762 A1* | 3/2005 | Daley et al. | 429/179 |
| 2006/0228619 A1* | 10/2006 | Bowen et al. | 429/39 |

FOREIGN PATENT DOCUMENTS

JP  2001015127  1/2001

OTHER PUBLICATIONS

Roger Wise ; TWI Knowledge Summary; Solvent welding of thermoplastics: Available from http://www.twi.co.uk/j32k/protected/band_3/ksrw002.html.

Plastics joining; Ultrasonic Welding technique—The process; Available from http://www.twi.co.uk/j32k/protected/band_3/pjkultrason.html.

JP2001015127, Japanese Abstract, Jan. 19, 2001.
PCT Search Report, PCT/US2006/004359, Dec. 12, 2006.

* cited by examiner

*Primary Examiner* — R Hodge
*Assistant Examiner* — Stephen Yanchuk
(74) *Attorney, Agent, or Firm* — Joseph J. Christian (57) ABSTRACT

An electrochemical cell structure is provided which includes an anode, a cathode spaced apart from said anode, an electrolyte in ionic communication with each of said anode and said cathode and a nonconductive frame. The nonconductive frame includes at least two components that support each of said anode, said cathode and said electrolyte and define at least one flowpath for working fluids and for products of electrochemical reaction.

13 Claims, 9 Drawing Sheets

ELECTROCHEMICAL CELL STRUCTURE AND METHOD OF MAKING THE SAME

CROSS REFERENCE TO RELATED APPLICATIONS

This application is a continuation-in-part of U.S. patent application Ser. No. 11/103,971, entitled 'Electrochemical Cell Structure,' filed 12-Apr.-2005, which is herein incorporated by reference.

STATEMENT REGARDING FEDERALLY SPONSORED RESEARCH & DEVELOPMENT

This invention was conceived or first reduced to practice under a project funded by the Department of Energy under contract DE-FC36-04GO14223. The United States Government has certain rights related to this invention.

BACKGROUND

The invention relates generally to electrochemical cell structures and more specifically to electrochemical cell structures having nonconductive frames that support the anode, the cathode and the electrolyte and define flowpaths for working fluids and for products of electrochemical reaction.

Electrochemical cells are energy conversion devices that are usually classified as either electrolysis cells or fuel cells. Electrolysis cells can function as hydrogen generators by electrolytically decomposing water to produce hydrogen and oxygen gases. Fuel cells electrochemically react a hydrogen gas with an oxidant across an exchange membrane or electrolyte to generate electricity and produce water.

Alkaline electrolysis systems have been commercially available for several decades. Direct current voltage of about 1.7V to about 2.2V is applied to two electrodes that are positioned within a liquid electrolyte containing alkali. At the positive electrode (anode), oxygen is produced and at the negative electrode (cathode), hydrogen forms. An ion-permeable diaphragm keeps the gases separated.

For electrochemical systems, especially alkaline electrolysis systems, to become economically feasible the manufacturing costs associated with these systems must markedly improve.

Current systems require numerous process steps during assembly, with each step adding cost to the overall system. Additionally, conventional systems currently have many individual components including multiple gaskets, bolts and other miscellaneous parts that add to the complexity of the system assembly and drive the manufacturing costs up.

Accordingly, there is a need for an improved electrochemical cell that promotes an overall reduction in the number of component parts and simplifies the associated manufacturing and fabrication process.

BRIEF DESCRIPTION

Briefly, according to one embodiment of present invention, an electrochemical cell structure is provided which includes an anode, a cathode spaced apart from said anode, an electrolyte in ionic communication with each of said anode and said cathode and a nonconductive frame. The nonconductive frame includes at least two components that supports each of said anode, said cathode and said electrolyte and defines at least one flowpath for working fluids and for products of electrochemical reaction.

Another embodiment of present invention provides for a method of making an electrochemical cell structure that includes capturing a diaphragm and an electrode insert individually in nonconductive frames, assembling a repeat unit from said diaphragm and said electrode insert, building a stack of said repeat units, fabricating a nonconductive housing frame made in at least two parts and provided with positive engagement attributes, inserting said stack of repeat units into one of said at least two parts of said nonconductive housing frame, and positioning other part of said at least two parts of said nonconductive frame and sealing the structure so formed to provide a leak proof assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
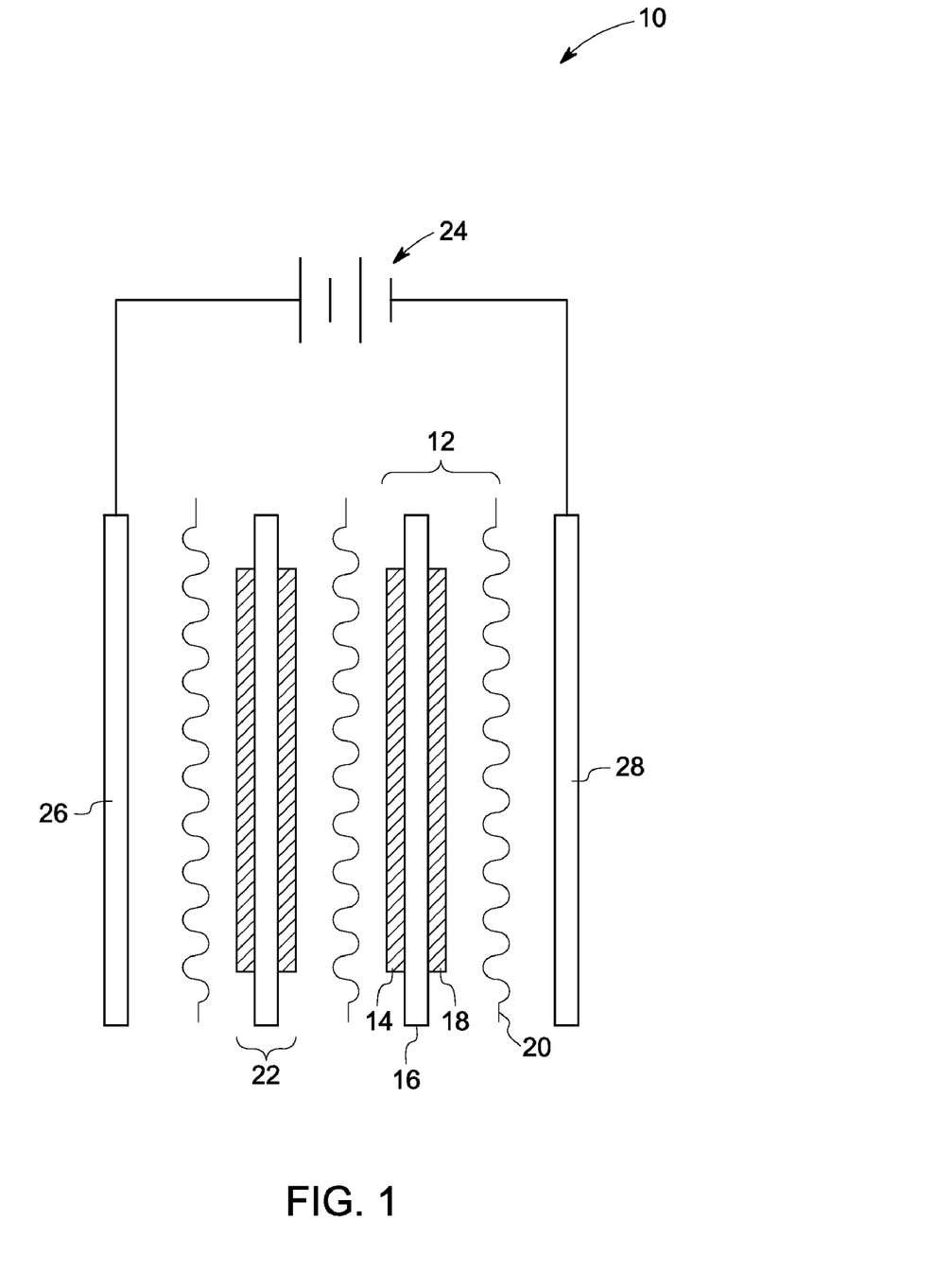
FIG. 1 is schematic representation of an exemplary alkaline electrolysis stack arrangement.

FIG. 1 is a schematic representation of an exemplary stack arrangement of an electrochemical system, for example an alkaline electrolysis system. A typical stack assembly 10 includes a plurality of repeat units 12. Each repeat unit 12 includes an anode 14, a bipolar plate 16, a cathode 18 and a diaphragm 20. The number of repeat units in the stack depends on the requirements for rate of production of product gases—e.g. rate of production of Hydrogen in case of an alkaline electrolysis system. Any large-scale implementation of an alkaline electrolysis stack may include as many as a hundred or more repeat units 12. Each repeat unit 12 requires electrical coupling between the anode 14, the bipolar plate 16 and the cathode 18, referred to as the electrode assembly 22. Direct current voltage 24 is applied to the terminal anode 26 through an optional anode current collector (not shown) and the terminal cathode 28 through an optional cathode current collector (not shown). The working fluid constitutes an ionic bridge between the cells and a voltage is developed across each anode 14 and cathode 18 in the stack, thus allowing for electrolysis reaction to happen at the anode and the cathode. Working fluid for electrolysis is an electrolyte, which for alkaline electrolysis is typically a potassium hydroxide (KOH) or sodium hydroxide (NaOH) solution. Each electrode assembly 22 must be separated by a diaphragm 20, primarily to keep hydrogen and oxygen gases from mixing between adjacent electrode assemblies 22. All of the repeat units 12 within a stack must be positioned within some type of housing, and surrounded by sealing arrangements, and piping or manifolds to distribute the electrolyte and to capture the hydrogen and oxygen gases. Repeat units are typically metallic and therefore must be insulated from one another with non-conductive gasketing in order to prevent electrical shorting between repeat units. Sealing the repeat units to one another with these gaskets typically requires a large number of bolts and creates a large number of potential leak areas. In large-scale electrolysis systems, that involve hundreds of repeat units, hundreds or possibly thousands of connections and bolts or other fasteners are used to assemble the stack. Thus the stack assembly in these electrochemical systems is complex, needs multiple components to be assembled and involve large fabrication and assembly costs.

To overcome these shortcomings, an electrochemical system is proposed that reduces the number of parts required in the assembly, and also reduces the number of steps required to assemble the electrochemical assembly. Further the proposed system obviates the requirement of separate sealing mechanisms and elaborate piping required in the conventional electrochemical systems.

Figure 2:
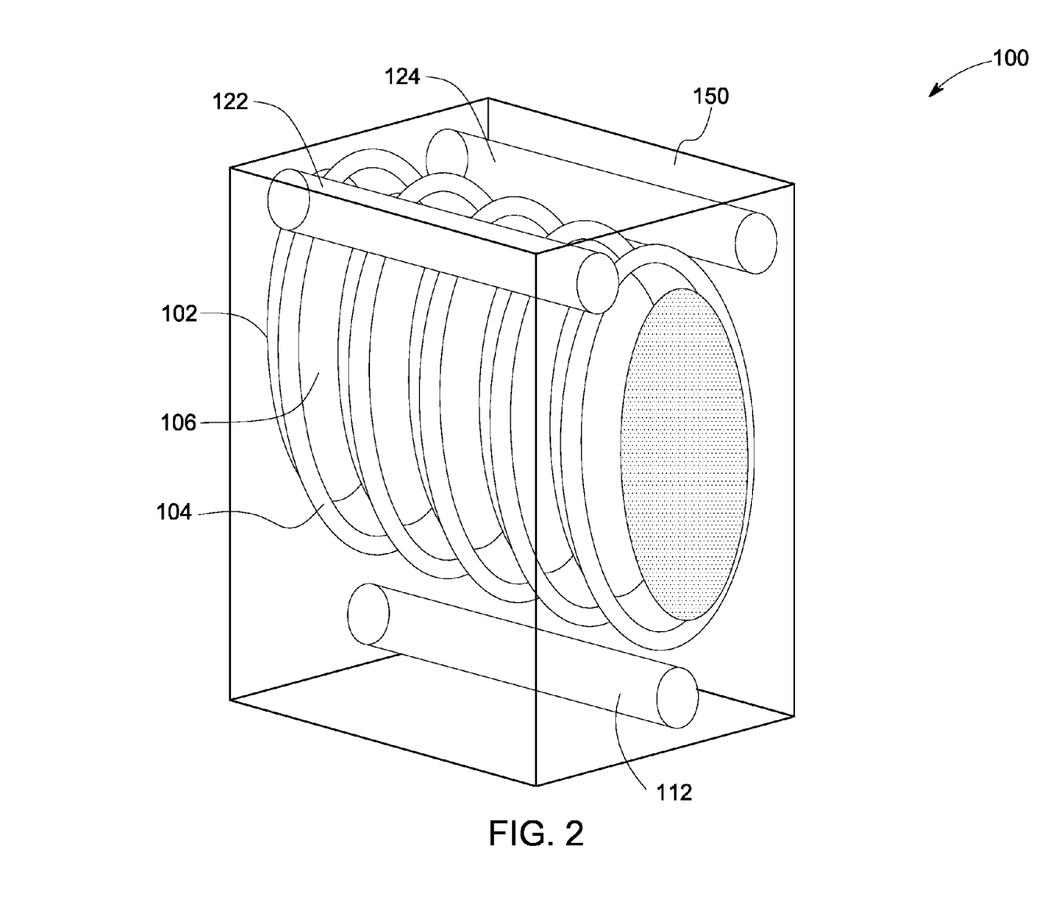
FIG. 2 is a side cross-sectional view of one embodiment of the instant invention.

As shown in FIG. 2, an electrochemical cell structure 100 is provided, comprising an anode 102, a cathode 104 spaced apart from the anode 102, and a single-piece nonconductive frame 150. The single-piece nonconductive frame 150 supports the anode 102, the cathode 104 and defines a plurality of flowpaths like 112, 122 and 124 for working fluids (not shown) or products of electrochemical reaction (not shown). Thus the construction of the stack is efficient and effective (no gaskets or seals are required) and the fabrication process is simplified.

In one embodiment, the nonconductive frame 150 comprises a material having a maximum working temperature in a range between about 60 degrees Celsius to about 120 degrees Celsius. This temperature range would support most alkaline electrolysis applications. In another embodiment, the nonconductive frame 150 comprises a material having a maximum working temperature in a range between about 60 degrees Celsius to about 300 degrees Celsius. This temperature range would support electrolysis applications including but not limited to alkaline electrolysis, PEM electrolyzer, acid electrolysis etc. This temperature range also supports fuel cell applications including but not limited to alkaline fuel cells, PEM fuel cells, phosphoric acid fuel cell etc.

In one embodiment of the instant invention, the nonconductive frame 150 comprises a polymer, typically a polymer chemically resistant to caustic to avoid degradation during prolonged exposure to bases like KOH or NaOH. In another embodiment, the nonconductive frame 150 comprises a hydrolytically stable polymer. In other embodiment, the polymer selected for making the non-conductive frame is both chemically resistant and hydrolytically stable. In another embodiment, the nonconductive frame 150 comprises a polymer selected from the group consisting of polyethylene, fluorinated polymers, polypropylene, polysulfone, polyphenyleneoxide, polyphenylenesulfide, polystyrene and blends thereof.

Figure 3:
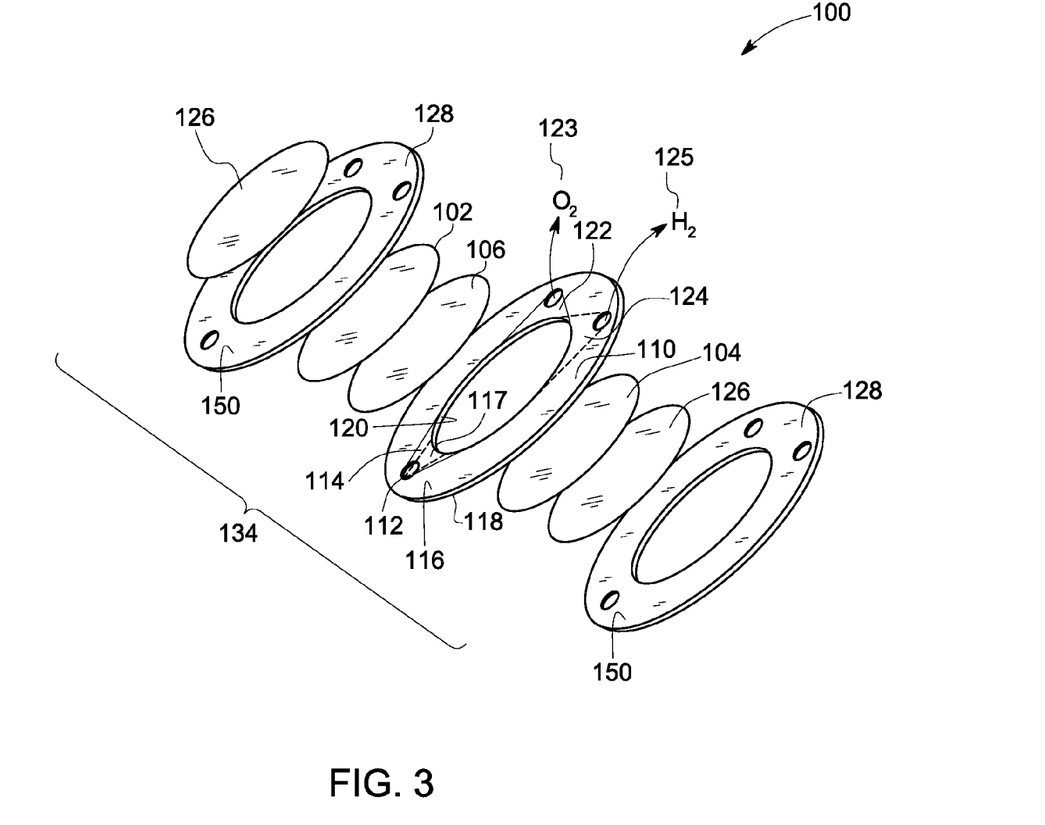
FIG. 3 is an exploded view of one embodiment of the instant invention.
Figure 4:
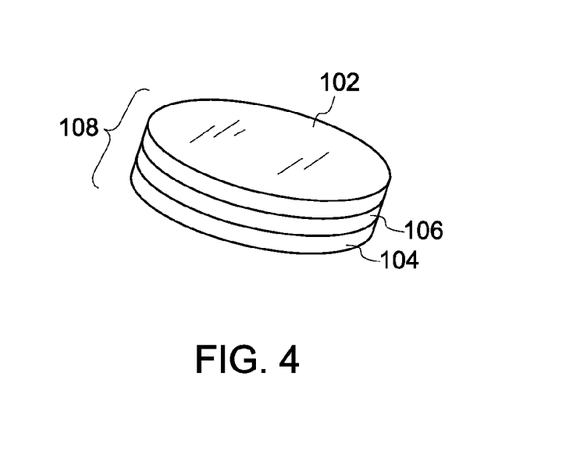
FIG. 4 is a schematic of an electrode insert.

Electrochemical cell structure 100 is shown in an exploded view to better demonstrate the constituent parts in FIG. 3. Electrochemical cell structure 100 comprises an anode 102 and a cathode 104 spaced apart from the anode 102. A bipolar plate 106 is interposed between the anode 102 and the cathode 104 to enable an electrical connection therebetween. In one embodiment of the invention, as shown in FIG. 4, anode 102, bipolar plate 106 and cathode 104 are joined together to create an electrode insert 108. An electrode frame 110 supports electrode insert 108. Electrode frame 110 has at least one inlet 112 for flow of working fluids. For an electrolysis system e.g. an alkaline electrolysis system, the working fluid comprises electrolyte, typically a potassium hydroxide solution. For a fuel cell, the working fluids comprise hydrogen or a fuel stream and an oxidant stream. For sake of simplicity, the electrochemical cell structure 100 is described herein with respect to an alkaline electrolysis system.

As shown in FIG. 3, the electrode frame 110 further comprises a first electrolyte flowpath 114 on a top surface 116, a second electrolyte flowpath 117 (shown with dotted lines) on a bottom surface 118, a seat 120, an oxygen flowpath 122 on top surface 116 and a hydrogen flowpath 124 (shown with dotted lines) on bottom surface 118. Electrode insert 108 is positioned on seat 120. Electrochemical cell structure 100 further comprises a diaphragm 126 and a diaphragm frame 128. For purposes of discussion, in this embodiment, the diaphragm frame 128, the diaphragm 126, the electrode insert 108, and the electrode frame 110 form a repeat unit 134. The number of repeat units 134 in a stack depends on the requirements for rate of production of product gases—e.g. rate of production of Hydrogen in case of an alkaline electrolysis system among other factors. The stack is typically capped with an end cap (not shown) on either side. Each end cap houses an electrode and a current collector. The current collectors are connected to an external DC power source.

Figure 5:
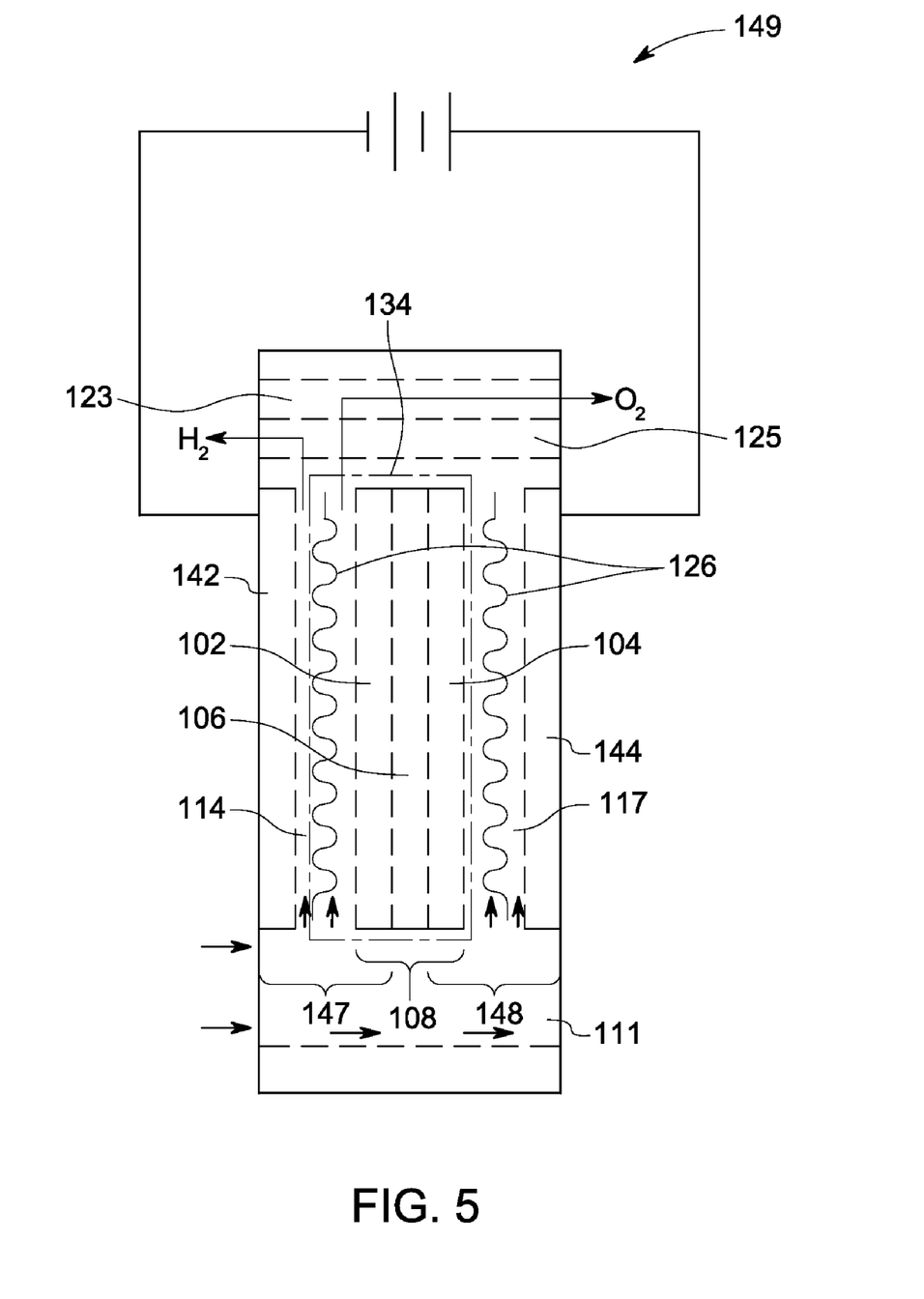
FIG. 5 is a side view of an electrochemical cell structure with one repeat unit.

FIG. 5 is a side view of an electrochemical cell structure with one repeat unit, generally shown as 149. The repeat unit 134 comprises a diaphragm 126, an electrode insert 108 which in turn consists of an anode 102, a bipolar plate 106 and a cathode 104. A terminal cathode 142 including a current collector (not shown) and a terminal anode 144 including a current collector (not shown) are disposed at the extreme ends of stack 149. The cell structure also includes a diaphragm 126 between the repeat unit 134 and terminal anode 144. It is seen that the cell structure with one repeat unit has two electrochemical cells, 146 and 148 as identified in FIG. 5. First electrolytic cell 146 includes terminal cathode 142, diaphragm 126 and anode 102. Second electrolytic cell includes cathode 104, diaphragm 126 and terminal anode 144. The terminal cathode and terminal anodes are connected to a power source 24. The electrolyte is introduced into stack 149 from inlet 111. The electrolyte is distributed through one or more individual electrolyte inlets (not shown) for each electrolytic cell to flowpaths 114 and 117. Electrolysis reaction takes place in the electrolysis cells 146 and 148 when appropriate power source is connected to the cell structure. The hydrogen and oxygen gases generated in the stack are removed from hydrogen outlet 125 and oxygen outlet 123 respectively.

Typical large-scale implementation of an electrolysis stack involves a large number of repeat units 134 similar to ones shown in FIG. 5. Other arrangement in the stack remains similar to one repeat unit stack described above. The construction of this exemplary repeat unit 134 is simple and avoids the use of seals or gaskets. As depicted, the electrode insert 108 and the diaphragms 126 are supported and encased within the single-piece nonconductive frame of repeat unit 134. The flowpaths for the electrolyte are also defined by the single-piece nonconductive frame of repeat unit 134, essentially removing any need for gasketing within the system.

Figure 6:
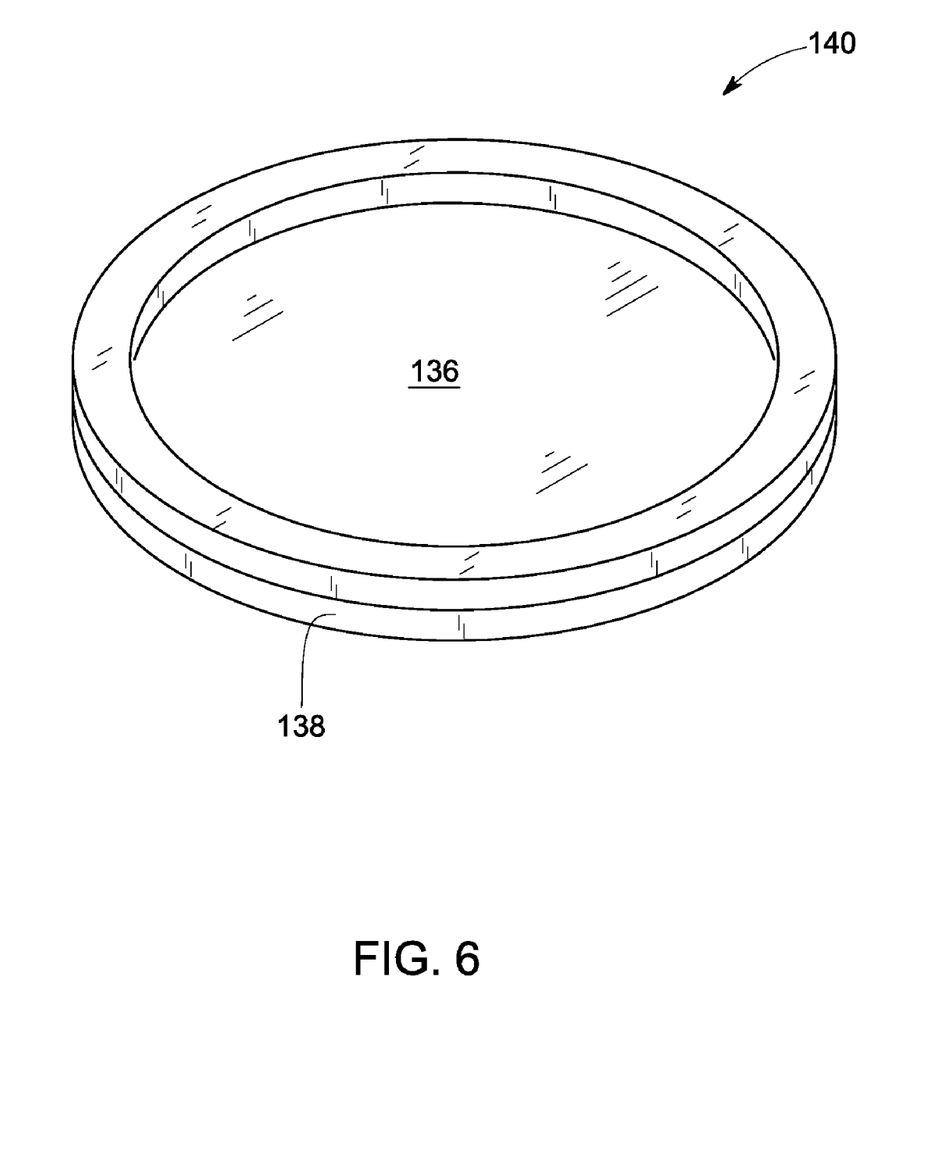
FIG. 6 is a schematic of a component of the repeat unit.

Alternatively the components of repeat unit—the electrode insert 108 and diaphragms 126 may be individually captured in a non-conductive frame. The frames for the electrode insert and the diaphragm may have arrangements so that after assembled, it forms flowpaths for the electrolyte and the product gases. FIG. 6 shows such a component individually captured in a non-conductive frame depicted generally as 140. 136 generically represents an electrode insert (component 108 as shown in FIG. 4) or a diaphragm (component 126 as shown in FIG. 3). Component 136 is captured in a non-conductive ring 138. The non-conductive ring may have flowpaths (not shown) configured for the flow of electrolyte and the product gases e.g., the ring may provide flowpaths 114 and 117 for the flow of working fluid and flowpaths 122 and 124 for removing products of electrochemical reaction. The ring may also have provisions for one or more electrolyte inlets 112 for individual cell. The ring structure also helps prevent a leakage of electrolyte or product gases from the repeat units and act as seal rings. In one embodiment the nonconductive frame 111 and the nonconductive frame 150 housing the stack are made of same material.

In one embodiment, the nonconductive frame 150 comprises a material having a maximum working temperature in a range between about 60 degrees Celsius to about 120 degrees Celsius. This temperature range would support most alkaline electrolysis applications. In another embodiment, the nonconductive frame 150 comprises a material having a maximum working temperature in a range between about 60 degrees Celsius to about 300 degrees Celsius. This temperature range would support most electrolysis and fuel cell applications. In one embodiment of the instant invention, the nonconductive frame 150 comprises a polymer, typically a polymer chemically resistant to caustic to avoid degradation during prolonged exposure to bases like KOH or NaOH. In another embodiment, the nonconductive frame 150 comprises a hydrolytically stable polymer. In other embodiment, the polymer selected for making the non-conductive frame is both chemically resistant and hydrolytically stable. In another embodiment, the nonconductive frame 150 comprises a polymer selected from the group consisting of polyethylene, fluorinated polymers, polypropylene, polysulfone, polyphenyleneoxide, polyphenylenesulfide, polystyrene and blends thereof.

Figure 7:
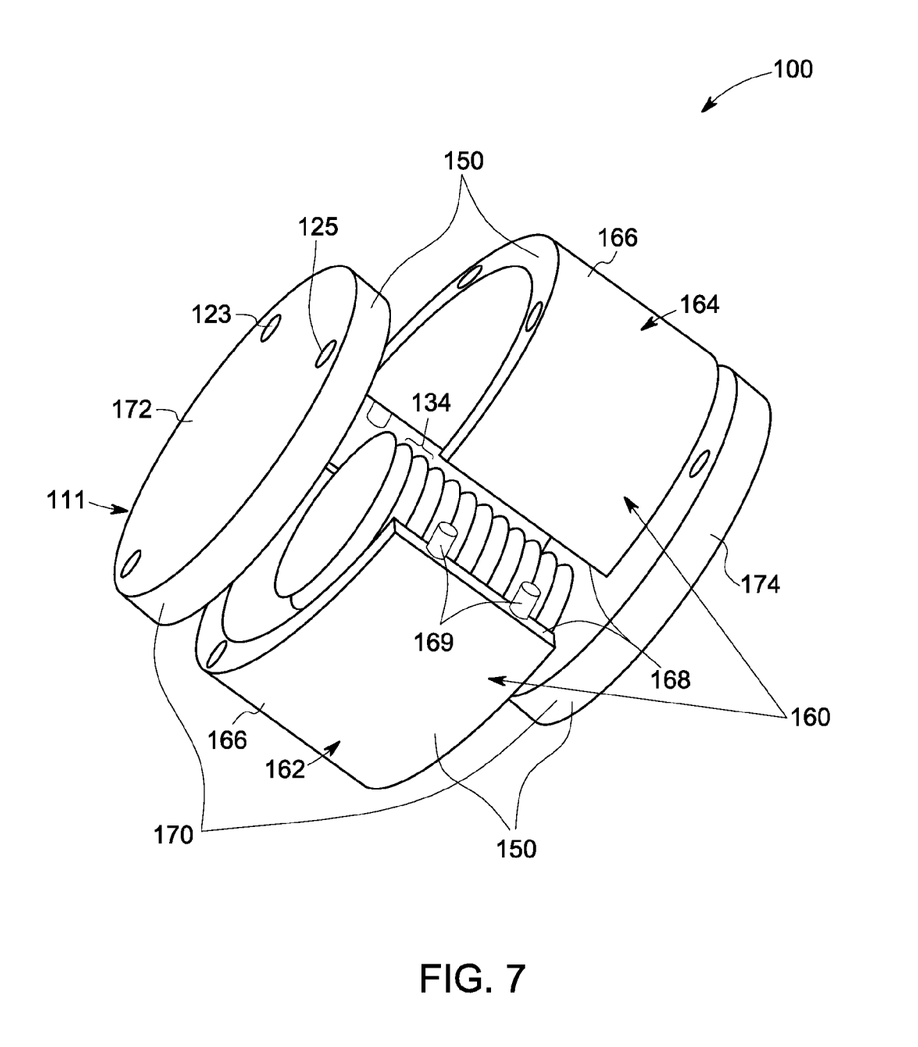
FIG. 7 is an exploded view of another embodiment of the instant invention.
Figure 8:
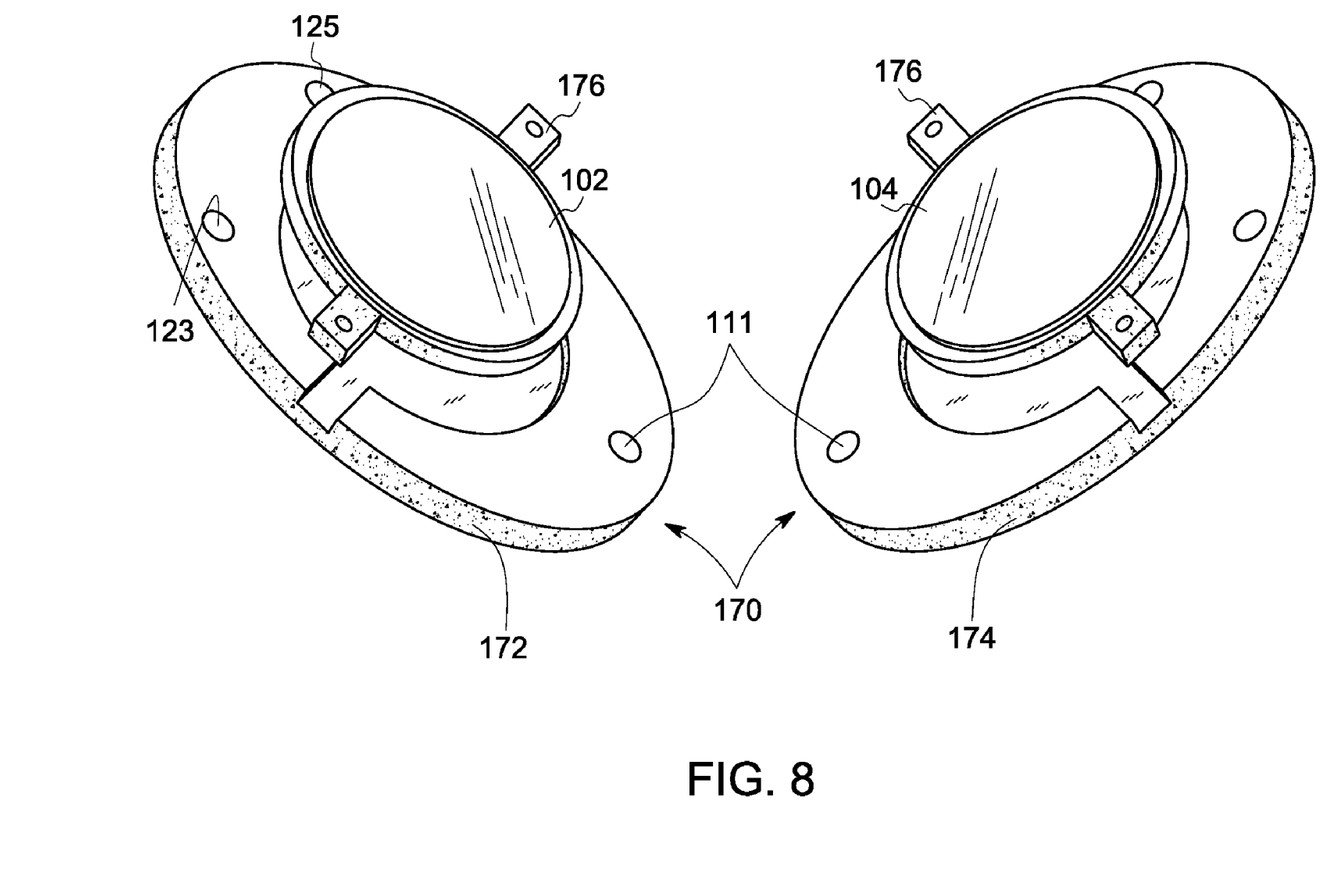
FIG. 8 is a schematic of typical end plates.

FIG. 7 shows electrochemical cell structure 100 according to another embodiment of the invention. The nonconductive frame 150 is made of peripheral section 160 and end plate section 170. The peripheral section 160 may be made of one or more parts. FIG. 7 shows an embodiment where the peripheral section 160 is made of two parts 162 and 164. Depending on ease of fabrication, the peripheral section may include more than two parts. The peripheral section 160 is formed, pre-molded or machined to accept the plurality of repeat units 134 described above and to provide the flowpaths 114 and 117 for the working fluids and flowpaths 122 and 124 for the products of electrochemical reaction. In some embodiments, the peripheral section 160 is cylindrical in shape. In some other embodiments, the peripheral section 160 may be prismatic. The parts of the peripheral section, 162 and 164 are prepared by a variety of techniques including but not limited to injection molding, extrusion, thermoforming and the like. The end plate section 170 is made of two parts 172 and 174. The end plate section 170 is illustrated in FIG. 8. The parts 172 and 174 of the end plate section 170 are configured to house the anode 102 and the cathode 104 respectively. The end plates are also provided with current collectors 176 and a seal tight access (not shown) to external power source. The end plate parts are also provided with at least one port 111 supplying the electrolyte to the stack. Ports 123 and 125 are outlets for oxygen and hydrogen respectively.

As shown in FIG. 7, part 162 of the peripheral section typically includes a curved surface 166 and a sidewall 168. The parts 162 and 164 of the peripheral section 160 are arranged such that the sidewalls 168 of parts 162 and 164 are opposite to each other. The sidewalls 168 of both parts 162 and 164 are provided with positive engagement attributes 169 that help assembling of various parts of the peripheral section. FIG. 7 shows stub like projections 169 on the sidewall 168 of part 162. On the sidewall 168 of the part 164 of the peripheral section 160, disposed opposite to sidewall the 168 of the part 162, corresponding recesses are provided to receive the projections 169. Alternate positive engagement attributes may include ridges and grooves, projections and receiving arrangement of various shapes and size, or simple plain surfaces provided with arrangements for bolting. In some embodiments, the sidewalls 168 are configured in polygonal shapes that provide positive engagement between the parts of peripheral sections and separate projections 169 may not be required.

The parts 162 and 164 of the peripheral section 160, may be joined by a variety of techniques including but not limited to using adhesives, polymer welding etc. In one embodiment, the parts of peripheral sections are joined together by adhesives. Typically epoxy based additives are used, but other additives may be used depending on the polymer used for making the nonconductive frames.

The joining of the parts 162 and 164 of the peripheral section 160 may also be carried out by polymer welding. During polymer welding, the polymer chains of two sidewalls 168 of peripheral sections 162 and 164 are made to entangle with each other, resulting in a homogeneous joint. The welding of polymers may be carried out in multiple ways. In one embodiment, the parts 162 and 164 are joined using fusion welding that uses heat or current to raise the temperature of the parts above the appropriate transition temperature i.e. the glass transition temperature, for amorphous thermoplastic polymers, or the melting temperature, for semi-crystalline polymers.

The parts 162 and 164 may also be joined using solvent welding, wherein a solvent is applied to the sidewalls 168 that temporarily dissolves the polymer and the two sidewalls may be fused. The solvent is then made to permeate out of the polymer and, to have a solvent weld.

Ultrasonic welding may also be used to join the parts 162 and 164. The process involves the use of high frequency sound energy to soften or melt the thermoplastic at the joint. The sidewalls 168 are held together under pressure and are then subjected to ultrasonic vibrations usually at a frequency of 20, 30 or 40 kHz.

Other welding techniques that may be employed to weld the sidewalls 168 of the parts 162 and 164 of the peripheral frame include extrusion welding, laser welding etc. After welding of the parts 162 and 164 by any of the preceding methods, the joint is cooled to form a stable structure.

In some embodiments a compression ring is wound around the stack to compress the sections together either as a heat-shrink fit or with mechanical compression on the band. This embodiment provides for additional creep resistance and is suitable for pressurized operation of the electrolyzer stack. In some embodiments, the sections might be provided with provisions for example. flanges, that may be bolted together. These bolts for example may be oriented in a tangential direction along the axis of the stack. The advantage of this arrangement over conventional bolting arrangement is that the bolt length is independent of stack length. Also there is no need of multiple gaskets unlike conventional electrolyzer stacks.

The parts 172 and 174 of the end plate section 170 are also provided with positive engagement attributes to achieve proper locking and leak proof joints between the peripheral sections and the end plate section. The positive engagement attributes on the end plate section 170 and the methods of joining the parts are similar to those described above for the peripheral section 160.

Figure 9:
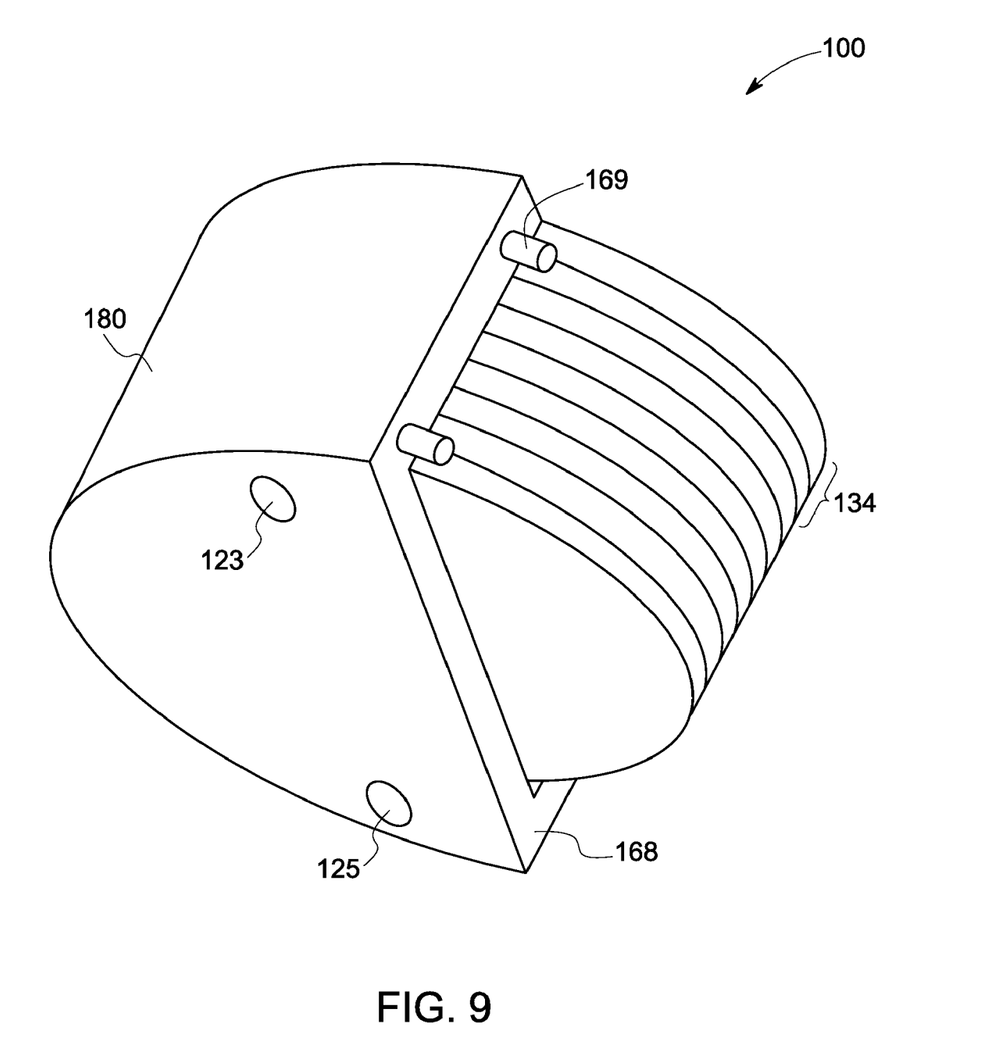
FIG. 9 is an exploded view of yet another embodiment of the instant invention.

In an alternate embodiment, the nonconductive frame 150 is made from only two parts. FIG. 9 shows one such part 180 of the nonconductive frame 150. In this embodiment, the peripheral frame and the end plates are combined to provide a housing for the plurality of repeat units 134. Therefore the flowpaths for the products of electrochemical reaction (not-shown) are integrated with the outlets 123 and 125 for the products of electrochemical reaction and the flowpaths for the working fluids (not-shown) are integrated with the inlets (not shown) for working fluids. The internal surface of the frame part 180 is configured to receive a stack of a plurality of repeat units 134. The sidewalls 168 of parts of frame sections are provided with positive engagement attributes 169 described above. A variety of joining techniques described above may be employed to join the frames to assemble the stack.

Figure 10:
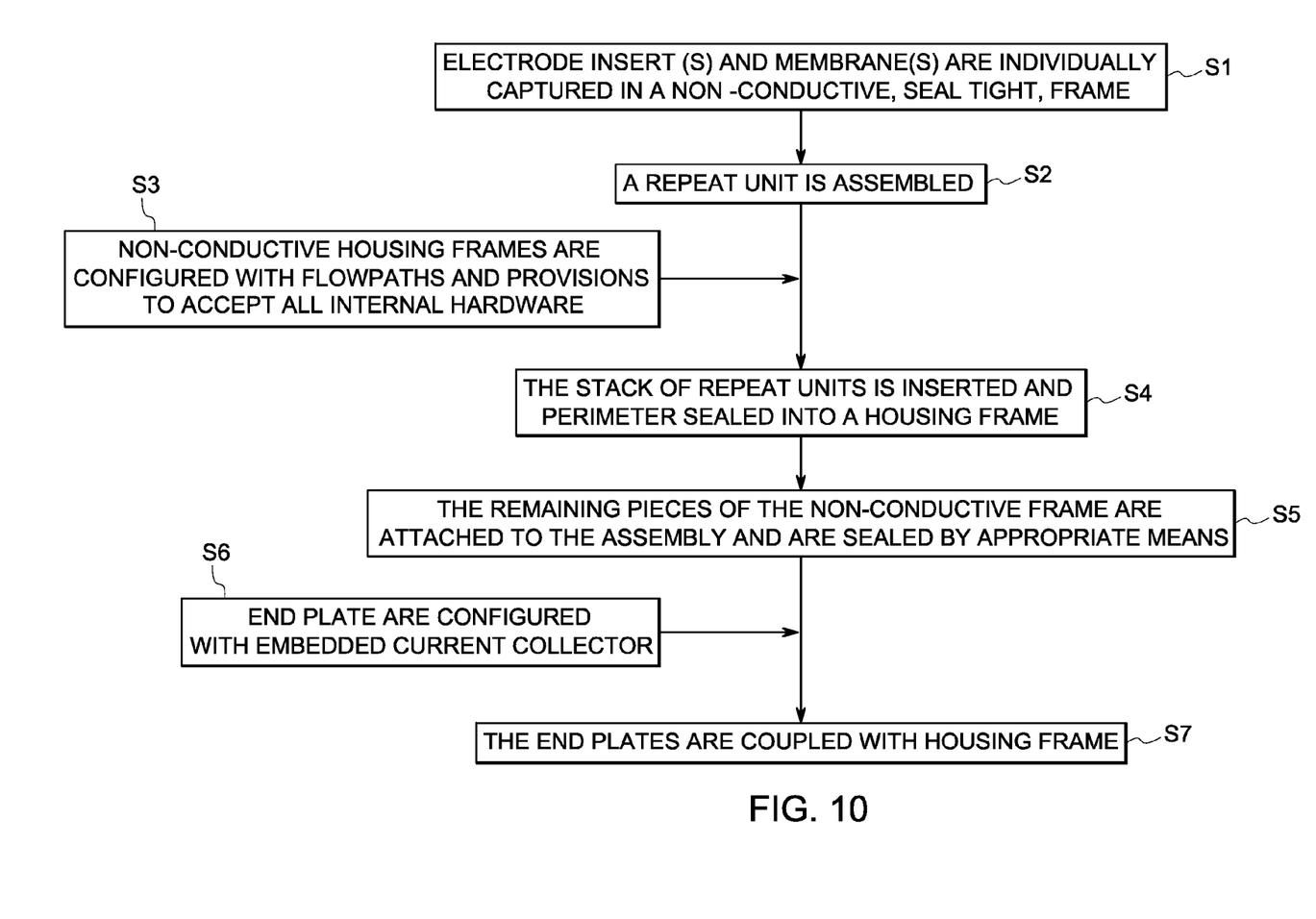
FIG. 10 is a flow chart representation of one method of fabrication of the instant invention.

In one embodiment of the invention, the electrochemical cell structure is fabricated according to the process discussed in FIG. 10. As shown in step S1, the components of the repeat units such as the diaphragm 126 and the electrode insert 108 are individually captured in nonconductive, seal tight frames. In step S2, the repeat units 134 are assembled from the framed components and a stack of multiple repeat units is built. The joining of the framed components to form a repeat unit and assembling of repeat units into a stack may involve any of the joining techniques outlined above.

The nonconductive housing frame 150 is separately fabricated. For ease of fabrication and assembly, the frame 150 is made from multiple sections typically the peripheral sections 160 and the end plate section 170. Each of these sections may further be made from multiple parts. Step S3 provides for the fabrication of peripheral section 170. For ease of manufacture, the peripheral section is made from two or more parts like 162 and 164. The parts 162 and 164 of the peripheral section 160 are configured to provide the flowpaths 114 and 117 for the flow of the working fluids and flowpaths 124 and 126 for the flow of the products of electrochemical reactions. The parts 162 and 164 are also provided with positive engagement attributes 169 to provide for proper engagement of the sections.

As shown in step S4, the stack of repeat units 134 is inserted into one part 162 of the peripheral section 160 of the nonconductive frame. Other pieces of the peripheral frame like 164 are joined in step S5 and the assembly is sealed. Step S6, provides for the end plate section 170. At step S7, the end plate section 170 that is joined to the peripheral section 160 that houses the stack of multiple repeat units 134.

The joining of frame sections at steps S5 and S7 is accomplished by a variety of techniques including but not limited to bolting, fusion welding, solvent welding, ultrasonic welding and laser welding.

While making the assembly shown in FIG. 10, steps S6 and S7 are redundant since the configuration does not employ separate end plates.

Embodiments of present invention are described herein taking examples of an alkaline electrolysis system. However, as it would occur to any skilled person in the art, the electrochemical cell structure described herein may also be used for other electrolysis like PEM or acid electrolysis and fuels cells like alkaline fuel cell, PEM fuel cell and carrying out any other electrochemical reactions.

Thus the embodiments of the invention provide for an electrochemical cell structure that has less number of parts, reducing the complexity of the assembly. There is no need of separate gasketing and sealing arrangement. The method of making the electrochemical cell structure is also highly efficient and simple.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrochemical cell structure, comprising:
at least one first electrically non-conductive frame supporting an electrode insert, the electrode insert comprising an anode, and a cathode spaced from said anode, and the first electrically non-conductive frame defines at least a first flowpath for electrochemical reactants and a second flowpath for electrochemical reaction products;
an electrolyte in fluid communication with each of said anode and said cathode;
at least one second electrically nonconductive frame supporting a diaphragm;
a third electrically non-conductive frame comprising at least two components, supporting the first and second electrically non-conductive frames; and
a joint securing the at least two components of said third electrically non-conductive frame, and the joint is a gasket-free seal that blocks a flow of the electrolyte through the joint during operation of the electrochemical cell structure.

2. An electrochemical cell structure in accordance with claim 1, wherein said electrochemical cell structure is suitable as an alkaline electrolyzer.

3. An electrochemical cell structure in accordance with claim 1, wherein said at least two components of said third electrically nonconductive frame are configured to have positive engagement attributes.

4. An electrochemical cell structure in accordance with claim 1, wherein said at least two components of said third electrically nonconductive frame are joined together using an adhesive.

5. An electrochemical cell structure in accordance with claim 1, wherein said at least two components of said third electrically nonconductive frame are joined together with at least one compression ring.

6. An electrochemical cell structure in accordance with claim 1, wherein said at least two components of said third electrically nonconductive frame are joined together by melting and cooling.

7. An electrochemical cell structure in accordance with claim 1, wherein said first, second and third electrically nonconductive frame comprises a polymer.

8. An electrochemical cell structure in accordance with claim 1, wherein said first, second and third electrically nonconductive frame comprises a material that is chemically resistant to caustic.

9. An electrochemical cell structure in accordance with claim 1, wherein said first, second and third electrically nonconductive frame comprises a hydrolytically stable polymer.

10. An electrochemical cell structure in accordance with claim 1, wherein said first, second and third electrically nonconductive frame comprises a material selected from the group consisting of fluorinated polymers, polysulfones, polyphenyleneoxide, polyphenylenesulfide, and polystyrene.

11. The electrochemical cell structure in accordance with claim 4, wherein the components of the third electrically nonconductive frames are joined together using an adhesive.

12. The electrochemical cell structure in accordance with claim 10 wherein the first, second and third electrically non-conductive frame comprises polyethylene or polypropylene.

13. The electrochemical cell structure in accordance with claim 1, wherein the third electrically nonconductive frame defines at least one flowpath for working fluids and at least one flowpath for products of electrochemical reaction in fluid communication with at least one flowpath in said first and second electrically non-conductive frame.

* * * * *